Feb. 28, 1961 W. ARMSTRONG 2,973,195
ROAD VEHICLE SUSPENSION SYSTEMS
Filed Oct. 21, 1957 2 Sheets-Sheet 1
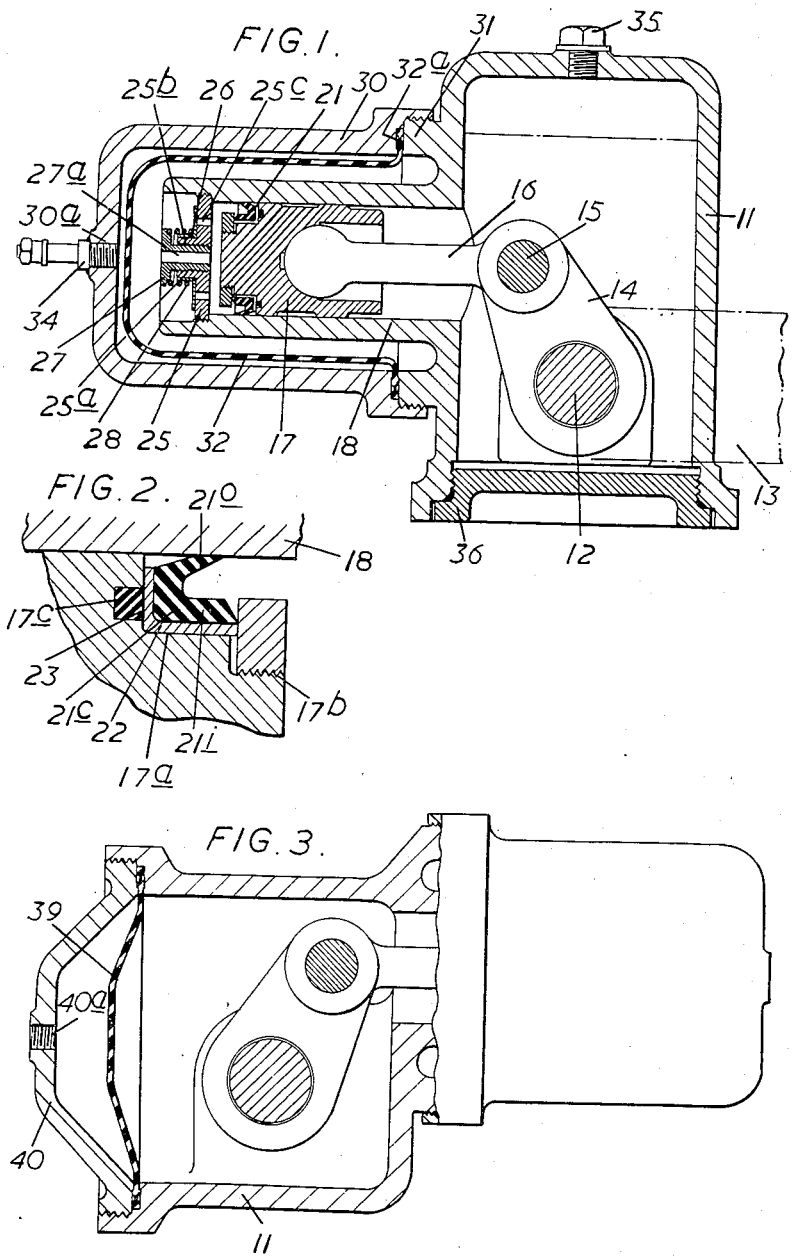
Inventor
WILLIAM ARMSTRONG
By
Neal, Browne, Schuyler & Beveridge
Attorneys

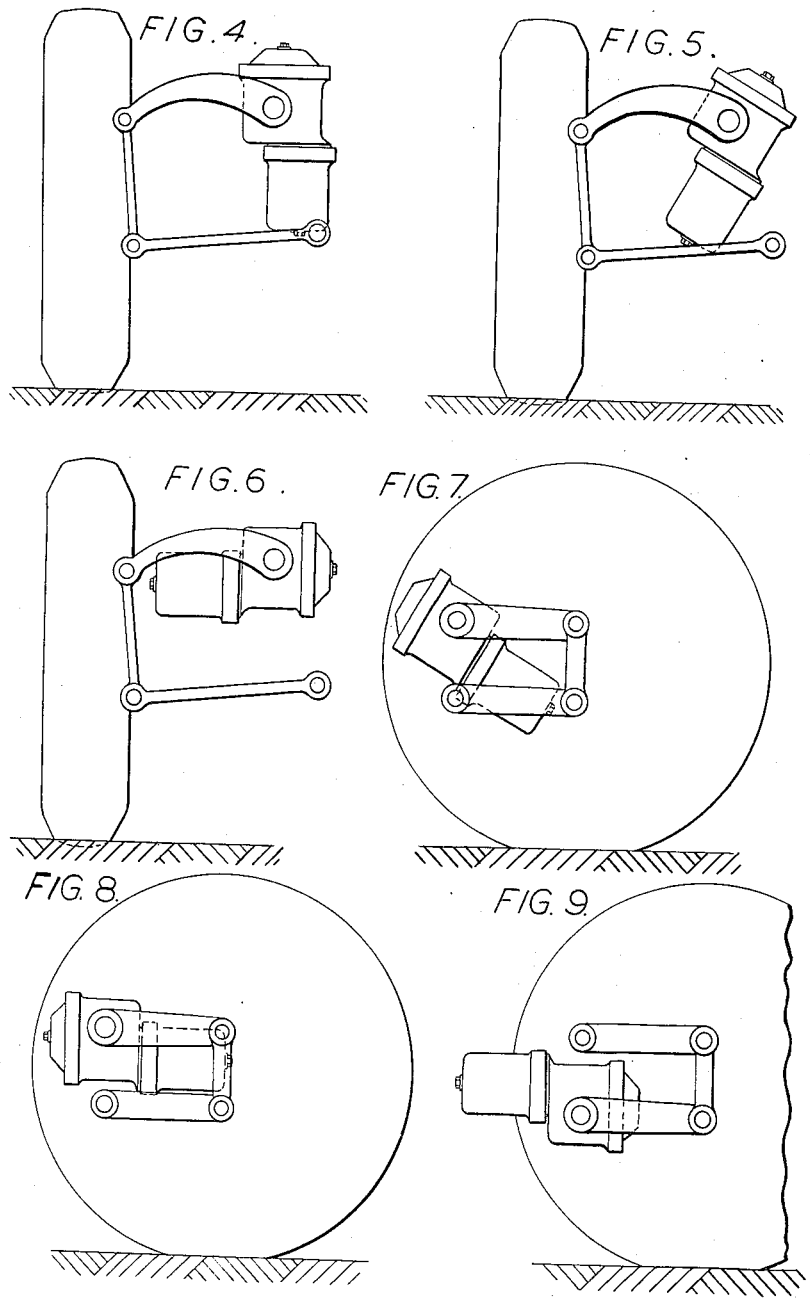

United States Patent Office 2,973,195
Patented Feb. 28, 1961

2,973,195

ROAD VEHICLE SUSPENSION SYSTEMS

William Armstrong, Eastgate, Beverley, England, assignor to Armstrong Patents Co. Limited, Eastgate, Beverley, England Filed Oct. 21, 1957, Ser. No. 691,396

Claims priority, application Great Britain Oct. 24, 1956

4 Claims. (Cl. 267—15)

This invention concerns combined suspension spring and shock absorber units in or for road vehicle suspension systems.

An object of the invention is to provide such a combined unit which can be incorporated in a suspension system to give improved riding performance.

According to the present invention a combined suspension spring and shock absorber unit comprises a body having a hydraulic cylinder therein, a shaft extending into the interior of said body and supported for turning movement in either of two directions with respect to said body, said shaft having a lever attached thereto externally of the body and a crank attached thereto within the body, said interior being partly filled with a hydraulic medium, a piston displaceable in the cylinder connected to the crank through a connecting rod, an elastic diaphragm partially defining by one of its faces a reservoir for hydraulic medium communicating with the cylinder by way of a flow restricting means, said means serving to restrict the flow of hydraulic medium between the cylinder and the reservoir due to piston displacements, and a pneumatic suspension spring constituted by an enclosed chamber partially defined by the other face of said diaphragm and containing a pneumatic medium. Such a unit thus comprises in effect a lever type shock absorber and a chamber of variable volume adapted to be charged with a pneumatic medium under pressure, the pressure in this chamber being transmitted to the hydraulic shock absorbing medium and thence to the lever, whereby the said chamber functions as a suspension spring.

Two such chambers of variable and differential volumes, acting to a determined degree, in effect in opposition, may provide the effect of spring means in both the weight-acting (or bump) and rebound directions.

The hydraulic piston is preferably provided with sealing means in the form of an elastic lipped ring which may for instance be of synthetic material having rubber-like resiliency.

The hydraulic medium and the pneumatic medium are preferably oil and air respectively. As an alternative to air, nitrogen or some other inert gas may be used.

The invention will be described further, by way of example, with reference to the accompanying drawings, in which:

Fig. 1 is a longitudinal section of one form of combined suspension spring and shock absorber;

Fig. 2 is a sectional detail on an enlarged scale;

Fig. 3 is a view partly in longitudinal section and partly in elevation of a preferred alternative form of combined suspension spring and shock absorber;

Figs. 4, 5 and 6 are front elevations showing alternative dispositions of the combined suspension spring and shock absorber illustrated in Fig. 3 as incorporated in a wishbone type of front wheel suspension; and Figs. 7, 8 and 9 are right side elevations showing alternative dispositions of the same in a trailing link type of front wheel suspension.

A combined pneumatic suspension spring and hydraulic shock absorber (Figs. 1 and 2) includes a body 11 adapted to be fixed, by means such as a flange or boss (not shown) to the chassis or frame of a road vehicle. A shaft 12 is journalled in bearings in the body and in a preferred form emerges through an oil seal at one side of the body where it is attached to, by splined engagement with, a lever arm 13 so that, depending upon the direction of movement of lever arm 13, the shaft will be turned one way or the other in body 11. In an alternative form the body 11 may be provided with an idler bearing at the opposite side to that carrying the oil seal to facilitate the use of twin levers 13 or a wishbone lever. A further alternative may be provided by the shaft 12 emerging through both sides of the body where it is attached to twin or wishbone lever arm 13. The shaft 12 is fixed within the body to a crank 14 carrying a crank pin 15 to which one end of a connecting rod 16 is swingably connected. The other end of the connecting rod is formed as a ball which is pivotally secured within a piston 17 which is displaceable in a cylinder 18 presented by the body 11.

A preferred sealing arrangement comprises a flexible ring 21, for instance of synthetic material having rubber-like resiliency, of a roughly U-shaped cross-section including a central annular portion 21c with radially inner and outer limbs 21i and 21o respectively. The outer limb projects in an inclined direction outwardly from the central portion and is of reduced thickness, so as to act as a flexible lip presenting a sealing surface extending generally contiguous with a part of the wall surface of the cylinder 18. The flexible ring 21 is bonded on the appropriate surfaces of its portions 21c and 21i to a metal ring 22 of L-section (i.e. of cylindrical shape with an outward flange).

The piston 17 is machined to present a spigot or reduced diameter portion 17a. The end portion of the piston is further reduced in diameter and externally screw-threaded at 17b. A groove 17c is machined in the shoulder between the full diameter portion of the piston and the spigot 17a. A flexible O-ring 23 is placed in the groove 17c and the metal ring 22 is urged against the aforementioned shoulder, thereby compressing the O-ring, by a nut 24 engaged on the threaded portion of the piston.

The cylinder 18 is closed by a head plate 25 which is threadedly engaged in a tapped counterbore of the cylinder. The head plate has a central boss 25a which has a tapped bore 25b extending axially therethrough.

The head plate 25 also has a number of bores 25c spaced at intervals around the boss. A valve member 26 has a cylindrical portion axially slidable on the outside of the boss 25a and an external flange or plate adapted to close the bores 25c in the head plate when the flange is in contact therewith. A flanged plug 27 axially bored at 27a is threadedly engaged in the tapped bore 25b of the head plate and its flange provides an abutment for a coiled spring 28 which urges the valve plate 26 into the position illustrated. Thus a passage defined by the bore 27a and a valve constituted by the valve member 26 and the apertures 25c provide communication between the space within the cylinder and that outside it.

The cylinder 18 is enclosed by a dome shaped diaphragm 32, which in turn is enclosed and surrounded by a dome 30, the diaphragm 32 being secured by means of a thickened flange portion 32a compressed between a flange of dome 30 and wall 31, the dome 30 being securely fixed to the body 11 by threads or other means.

Thus a toally enclosed chamber is formed between the external walls of the diaphragm 32 and the internal walls of dome 30. In this chamber a suitable pneumatic medium, e.g. air, is stored under pressure. Stored under an equal pressure is a hydraulic medium, e.g. oil, enclosed in the chamber formed between the internal walls of the diaphragm 32 and the head of the piston 17. The dome 30 has an air inlet non-return valve 34 engaged in a tapped axial bore 30a therein.

The body 11 has a filling plug 35 threadedly engaged in a bore in its upper wall surface and its otherwise open lower end is closed by a base plate 36 threadedly engaged therein.

In use the body 11 which is partially filled with oil, may be secured to the frame or chassis of the vehicle and the lever arms 13 arranged as the upper or lower links in a wheel suspension, with the load acting to rotate the shaft 12 anti-clockwise. In such an arrangement the load urges the piston 17 to the left, tending to compress the hydraulic medium against the diaphragm 32, thereby compressing the air, which thus functions as a suspension spring, and gives improved vehicle riding characteristics due to the progressively increasing spring rate of the pneumatic medium. Further variation in the rate characteristic may also be attained by virtue of the geometry effect of the crank mechanism, i.e. in dependence upon the angle initially defined, in the rest position of all the moving elements, between the crank 14 and the piston rod 16, since the magnitude of the linear movements imparted to the piston 17 by the shaft 12, via the crank 14 and piston rod 16, is a function of that angle. The behaviour of the pneumatic spring is capable of being varied by adjusting the initial quantity of pneumatic medium enclosed between the dome 30 and the diaphragm 32. Shock absorbing is effected by the hydraulic medium, the flow of which is controlled in both bump and rebound directions by the bore 27a. If, however, an excessive bump is encountered the valve member 26 is unseated, allowing oil to escape from the cylinder through the apertures 25.

In a preferred form of unit (Fig. 3) a second diaphragm 39 is disposed between the interior of the body 11 and a domed or dished end plate 40 closing said body behind the piston 17 and having a valve (not shown, but similar to the valve 34) engaged in a threaded bore 40a centrally disposed therein. A separate filling plug (not shown) is provided in the body 11 for introduction of a hydraulic medium, e.g. oil, thereto. In this unit the body is completely filled with oil. A pneumatic medium, e.g. air, is introduced under pressure into the space between the internal surfaces of dome 30 and the external surfaces of the diaphragm 32, and in addition a pneumatic medium, e.g. air, is introduced at some differential pressure into the space formed between the internal surface of the end plate 40 and the external surface of the diaphragm 39.

In the form of unit shown in Fig. 3, as in the form of unit shown in Figs. 1 and 2, the body 11 is adapted to be fixed, by means such as a flange or boss (not shown), to the chassis or frame of a road vehicle. That proportion of the total vehicle weight which is supported by any particular unit (and it is to be understood that there will normally be a unit associated with each vehicle wheel) is transmitted to the hydraulic medium enclosed between piston 17 and diaphragm 32, where it reacts against the compressed gas enclosed within the cover 30. In other words, the Fig. 3 unit is like the Fig. 1 unit insofar as the structure enclosed within dome 30 is concerned, and the Fig. 3 unit operates like the Fig. 1 unit insofar as supporting weight of the vehicle is concerned.

By providing a second diaphragm 39, and introducing a pneumatic medium, e.g. air, into the space formed between end plate 40 and diaphragm 39, the Fig. 3 unit includes what can be described as a rebound spring, thus further improving the characteristics of the suspension by virture of the fact that, with the vehicle in its normal riding position, a relatively soft suspension spring of the correct frequency can be introduced. When the vehicle is at rest, or when it is riding smoothly (without bumps), the hydraulic medium enclosed between piston 17 and diaphragm 32, and the compressed pneumatic medium enclosed within dome 30, are both subjected to vehicle weight pressure. In such a case, the pressure exerted by the hydraulic medium enclosed between piston 17 and diaphragm 32 is greater than the pressure exerted by the hydraulic medium which fills the hollow interior of body 11 (bounded in part by diaphragm 39 as shown in Fig. 3). When there is a bump stroke, there is a progessive increase of spring rate insofar as the pneumatic medium enclosed between dome 30 and diaphragm 32 is concerned and this cushions out violent shocks.

On rebound, which occurs relatively rapidly, piston 17 moves in an opposite direction from the direction of the bump stroke, and at a time when the pressure exerted by the hydraulic medium enclosed between piston 17 and diaphragm 32 continues to exceed the pressure exerted by the hydraulic medium which fills the hollow interior of body 11. The result is that the hydraulic medium in body 11 exerts a progressively increasing force against diaphragm 39 to thus produce a progressive increase in spring rate acting downwardly from the normal riding height of the vehicle to reduce pitching and rolling to a minimum.

Figs. 4, 5 and 6 illustrate alternative possible attitudes for installation of the unit of Fig. 3 in a wishbone type of front wheel suspension. Other alternative attitudes in a trailing link suspension are shown in Figs. 7, 8 and 9.

I claim:

1. A combined vehicle suspension spring and shock absorber unit comprising an at least partly hollow body, a hydraulic cylinder presented by said body, a shaft extending into the interior of said body and supported for turning movement in either of two directions with respect to said body, a crank attached to the shaft within the body, a piston displaceable in the cylinder, a connecting rod connecting the piston to the crank, a first flexible diaphragm secured to said body and in part defining by one of its faces adjacent the head end of said cylinder, a reservoir for hydraulic shock absorbing medium, a hydraulic shock absorbing medium flow restricting means placing said cylinder and reservoir in communication with one another, said means serving to restrict the flow of said shock absorbing medium between the cylinder and reservoir due to piston displacements, means defining with the other face of said flexible diaphragm, a pneumatic chamber containing a pneumatic medium and constituting a pneumatic suspension spring, a second flexible diaphragm secured to said body and located in the interior of said body behind said piston, and an end plate spaced from said second diaphragm and closing said body behind said piston, said end plate and said second diaphragm defining between them, a second pneumatic chamber containing pneumatic medium and constituting a pneumatic rebound spring.

2. A combined vehicle suspension spring and shock absorber unit comprising a hollow body formed with a pair of spaced pneumatic chambers each containing a pneumatic medium under pressure, a pair of flexible diaphragms secured to said body, there being a diaphragm associated with each of said chambers to in part define said chamber, said body being formed with an internal hydraulic cylinder located between said chambers, a piston displaceably arranged in said cylinder, means extending into said hollow body and connected to said piston to apply, vehicle suspension movements thereto, a hydraulic fluid reservoir defined between the head end of said cylinder and the flexible diaphragm of the adjacent pneumatic chamber, said diaphragm separating said pneumatic chamber from said reservoir, fluid flow restricting means placing said reservoir and hydraulic cylinder in communication with one another, said means serving to restrict the flow of hydraulic fluid between the cylinder and reservoir consequent upon piston displacements, said piston, cylinder and reservoir constituting a hydraulic shock absorber, and a hydraulic chamber defined between the flexible diaphragm of the other pneumatic chamber and the end of the hydraulic cylinder remote from the flow restricting means, said last-mentioned diaphragm separating said hydraulic chamber from said other pneumatic chamber, the varying hydraulic pressures in said hydraulic chamber and said hydraulic fluid reservoir set up by said piston displacements being transmitted by said diaphragms to their respective pnuematic chambers, whereby said chambers function as pneumatic suspension springs.

3. A combined vehicle suspension spring and shock absorber unit comprisng an at least partially hollow body, a hydraulic cylinder extending from and terminating in spaced relationship relative to the remainder of said body, a shaft extending into the interior of said body and supported in said body for turning movement in either of two directions with respect to said body, a crank attached to the shaft within the body, a piston displaceable in said hydraulic cylinder, a connecting rod connecting the piston to the crank, a dome-shaped flexible diaphragm secured to said body and enclosing said hydraulic cylinder, said diaphragm and said cylinder cooperating to define between them, a reservoir for hydraulic shock absorbing medium, a flow restricting means between said reservoir and the interior of said cylinder for restricting the flow of said shock absorbing medium between said reservoir and the interior of said cylinder upon displacement of said piston within said cylinder, said flow restricting means comprising a head plate closing the head end of the hydraulic cylinder, an axially bored central boss on said head plate projecting into said reservoir, said head plate having a plurality of bores therethrough spaced at intervals around said boss, a valve plate slideably arranged on said boss, and resilient means urging said valve plate into closing relationship over said spaced bores, and means enclosing said flexible diaphragm to define therewith a totally enclosed pneumatic chamber containing a pneumatic medium and constituting a pneumatic suspension spring.

4. A combined vehicle suspension spring and shock absorber unit comprising an at least partially hollow body, a hydraulic cylinder extending from and terminating in spaced relationship relative to the remainder of said body, a shaft extending into the interior of said body and supported in said body for turning movement in either of two directions with respect to said body, a crank attached to the shaft within the body, a piston displaceable in the cylinder, a connecting rod connecting the piston to the crank, said piston having a reduced diameter portion thereon adjacent the head end of said piston, and a sealing ring mounted upon said reduced diameter portion of said piston to define a seal between said piston and said hydraulic cylinder, said sealing ring being of generally U-shaped cross-section and comprising a central annular portion and radially inner and outer limbs extending generally axially from said central portion toward the piston head, the outer limb being of reduced thickness and outwardly inclined from the central portion to constitute a flexible lip extending generally contiguous with a part of the inner wall surface of the hydraulic cylinder, a dome-shaped flexible diaphragm secured to said body and enclosing said hydraulic cylinder, said diaphragm and said cylinder cooperating to define between them, a reservoir for hydraulic shock absorbing medium, a flow restricting means between the reservoir and the interior of said cylinder for restricting the flow of said shock absorbing medium between said reservoir and the interior of said cylinder upon displacement of said piston within said cylinder, and means enclosing said flexbile diaphragm to define therewith a totally enclosed pneumatic chamber containing a pneumatic medium and constituting a pneumatic suspension spring.

References Cited in the file of this patent

UNITED STATES PATENTS

| 2,004,539 | Rossman | June 11, 1935 |
| 2,481,150 | Pifer et al. | Sept. 6, 1949 |
| 2,644,699 | Weiertz et al. | July 7, 1953 |
| 2,724,590 | Irwin | Nov. 22, 1955 |
| 2,802,664 | Jackson | Aug. 13, 1957 |
| 2,825,579 | Heiss | Mar. 4, 1958 |

FOREIGN PATENTS

| 1,100,585 | France | Apr. 6, 1955 |